United States Patent
Knutson

(10) Patent No.: US 11,433,851 B2
(45) Date of Patent: Sep. 6, 2022

(54) VEHICLE SENSOR SYSTEM INCLUDING BAROMETRIC PRESSURE SENSORS

(71) Applicant: APTIV TECHNOLOGIES LIMITED, St. Michael (BB)

(72) Inventor: Eric P. Knutson, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 39 days.

(21) Appl. No.: 17/124,874

(22) Filed: Dec. 17, 2020

(65) Prior Publication Data

US 2022/0194315 A1    Jun. 23, 2022

(51) Int. Cl.
*B60R 25/10* (2013.01)
*B60R 25/32* (2013.01)

(52) U.S. Cl.
CPC .......... *B60R 25/1004* (2013.01); *B60R 25/32* (2013.01)

(58) Field of Classification Search
CPC ........ B60R 25/1004; B60R 25/32; G08G 1/16
USPC .............................. 340/901, 903, 425.5, 435
See application file for complete search history.

(56) References Cited

U.S. PATENT DOCUMENTS

| | | | |
|---|---|---|---|
| 5,546,799 A * | 8/1996 | Parker | G01P 5/14 702/148 |
| 7,486,200 B2 * | 2/2009 | Gerber | B62D 7/228 340/901 |
| 9,615,213 B2 * | 4/2017 | Tibbitts | B60T 8/172 |
| 10,124,768 B1 * | 11/2018 | Bocca | B60R 25/24 |
| 11,143,506 B2 * | 10/2021 | Donnellan | H04L 67/12 |
| 2002/0171553 A1 * | 11/2002 | Omry | G08B 21/06 340/576 |
| 2007/0290822 A1 | 12/2007 | Gerber | |
| 2011/0241377 A1 * | 10/2011 | Rogers | B62D 35/001 296/180.3 |
| 2014/0230571 A1 | 8/2014 | Pape et al. | |
| 2015/0153171 A1 * | 6/2015 | Zhou | G01C 5/06 702/138 |
| 2016/0231192 A1 * | 8/2016 | Hammerschmidt | G01L 9/0072 |
| 2017/0010174 A1 * | 1/2017 | Melen | G01L 27/005 |
| 2017/0350684 A1 * | 12/2017 | Maliszewski | G01B 5/0025 |
| 2018/0056812 A1 * | 3/2018 | Hamann | B60W 50/12 |
| 2018/0210447 A1 * | 7/2018 | Myers | B60W 50/14 |
| 2020/0200920 A1 * | 6/2020 | Irish | G06Q 10/06311 |
| 2020/0207331 A1 * | 7/2020 | Chang | G01P 13/025 |
| 2020/0254308 A1 * | 8/2020 | Walthert | B62J 45/40 |
| 2020/0271689 A1 * | 8/2020 | Nichols | G01S 7/497 |
| 2020/0276974 A1 * | 9/2020 | Tulpule | B60W 30/1882 |

(Continued)

OTHER PUBLICATIONS

Extended European Search Report for Application No. EP 21 21 2209 dated May 19, 2022.

*Primary Examiner* — Adnan Aziz
(74) *Attorney, Agent, or Firm* — Carlson, Gaskey & Olds, P.C.

(57) ABSTRACT

An illustrative example vehicle sensor system includes a plurality of barometric pressure sensors. A first barometric pressure sensor is situated on a first portion of the vehicle that faces at least partially in a first direction and a second barometric pressure sensor is situated on a second portion of the vehicle that faces at least partially in a second direction that is different than the first direction. A processor is configured to make a determination regarding vehicle motion based on respective indications from the plurality of barometric pressure sensors.

12 Claims, 1 Drawing Sheet

(56) References Cited

U.S. PATENT DOCUMENTS

| | | | |
|---|---|---|---|
| 2020/0284817 A1* | 9/2020 | Dumont | B61F 9/005 |
| 2021/0371121 A1* | 12/2021 | Magee | G07C 5/085 |
| 2021/0377907 A1* | 12/2021 | Choi | H04W 64/00 |
| 2021/0405213 A1* | 12/2021 | Tuck | G01S 19/49 |

\* cited by examiner

VEHICLE SENSOR SYSTEM INCLUDING BAROMETRIC PRESSURE SENSORS

BACKGROUND

Modern automotive vehicles include an increasing amount of electronic technology, such as sensors or detectors that provide driver assistance or autonomous vehicle control. Information regarding the movement or heading direction of the vehicle and the environment around the vehicle is useful or necessary for such assistance or control. There are various ways to obtain such information. For example GNSS satellite technology allows for determining and tracking vehicle location, movement or direction information based on detecting multiple satellites and using known algorithms. Inertial measurement units (IMUs) are useful for tracking vehicle movement in certain circumstances.

While such sensors and the information they provide have proven useful, IMU sensor drift and satellite signal availability can make it difficult or impossible to accurately determine the location or movement of the vehicle.

SUMMARY

An illustrative example embodiment of a vehicle sensor system includes a plurality of barometric pressure sensors including a first barometric pressure sensor situated on a first portion of the vehicle that faces at least partially in a first direction and a second barometric pressure sensor situated on a second portion of the vehicle that faces at least partially in a second direction that is different than the first direction. A processor is configured to make a determination regarding vehicle motion based on respective indications from the plurality of barometric pressure sensors.

In an example embodiment having at least one of the features of the system of the previous paragraph, the processor is configured to make the determination regarding vehicle motion by determining at least one of whether the vehicle is stationary or moving, and whether vehicle motion resulted from movement of air near the vehicle.

In an example embodiment having at least one of the features of the system of any of the previous paragraphs, the processor is configured to determine a direction of movement of air near the vehicle based on a relationship between the indication from the first barometric pressure sensor and the indication from the second barometric pressure sensor.

In an example embodiment having at least one of the features of the system of any of the previous paragraphs, the plurality of barometric pressure sensors includes a third barometric pressure sensor and a fourth barometric pressure sensor, the third barometric pressure sensor is situated on a third portion of the vehicle that faces at least partially in a third direction, the fourth barometric pressure sensor is situated on a fourth portion of the vehicle that faces at least partially in a fourth direction, the first direction is generally opposite the second direction, the third direction is generally perpendicular to the first and second directions, the fourth direction is generally opposite the third direction, and the processor is configured to determine the direction based on a difference between the indication from the third barometric pressure sensor and the indication from the fourth barometric pressure sensor and a difference between the indication from the first barometric pressure sensor and the indication from the second barometric pressure sensor.

In an example embodiment having at least one of the features of the system of any of the previous paragraphs and a vehicle motion sensor supported on the vehicle, the vehicle motion sensor is configured to provide an indication of vehicle motion, and the processor is configured to use the determination based on the indications from the barometric pressure sensors to interpret the indication from the vehicle motion sensor.

In an example embodiment having at least one of the features of the system of any of the previous paragraphs, the processor is configured to determine whether the indication from the vehicle motion sensor is a result of movement of air near the vehicle.

In an example embodiment having at least one of the features of the system of any of the previous paragraphs, the processor determines a direction of movement of the vehicle from rest based on the vehicle motion sensor indication; the determination based on the indications from the barometric pressure sensors includes a direction of air movement; the processor determines that the movement of the vehicle is a result of air movement when the direction of air movement corresponds to the direction of movement of the vehicle; and the processor determines that the movement of the vehicle from rest is a result of a force different than movement of the air when the direction of air movement does not correspond to the direction of movement of the vehicle.

In an example embodiment having at least one of the features of the system of any of the previous paragraphs, the processor interprets the indication from the vehicle motion sensor as a wake up signal to activate a vehicle alarm device based on determining that the movement of the vehicle is the result of the force different than the movement of the air, or the processor dismisses the indication from the vehicle motion sensor as a false alarm wake up signal based on determining that the movement of the vehicle is the result of the movement of the air.

In an example embodiment having at least one of the features of the system of any of the previous paragraphs, the processor is configured to determine that the vehicle is in motion independent of movement of the air when the indications from the vehicle motion sensor and the plurality of barometric pressure sensors correspond to movement of the vehicle in a direction that is opposite to a direction of the movement of the air; and the processor is configured to determine that movement of the vehicle is a result of movement of the air when the indications from the vehicle motion sensor and the plurality of barometric pressure sensors correspond to movement of the vehicle in a direction that is the same as the direction of movement of the air.

In an example embodiment having at least one of the features of the system of any of the previous paragraphs, the processor is configured to perform a calibration of the vehicle motion sensor when the determination regarding vehicle movement includes a determination that the vehicle is stationary.

In an example embodiment having at least one of the features of the system of any of the previous paragraphs, the calibration includes removing static errors from the indication from the vehicle motion sensor while there is no movement of the vehicle.

In an example embodiment having at least one of the features of the system of any of the previous paragraphs, the vehicle motion sensor comprises an inertial measurement unit including at least an accelerometer and a gyroscope.

An illustrative example embodiment of a method is for monitoring vehicle motion using a plurality of barometric pressure sensors including a first barometric pressure sensor situated on a first portion of the vehicle that faces at least partially in a first direction and a second barometric pressure sensor situated on a second portion of the vehicle that faces at least partially in a second direction that is different than the first direction. The method includes making a determination regarding vehicle motion based on respective indications from the plurality of barometric pressure sensors.

In an example embodiment having at least one of the features of the method of the previous paragraph, making the determination regarding vehicle motion comprises determining at least one of whether the vehicle is stationary or moving, and whether vehicle motion resulted from movement of air near the vehicle.

In an example embodiment having at least one of the features of the method of any of the previous paragraphs, a vehicle motion sensor is supported on the vehicle and provides an indication of vehicle motion, and the method includes processing the indication from the vehicle motion sensor based on the determination regarding vehicle motion based on the indications from the plurality of barometric pressure sensors.

In an example embodiment having at least one of the features of the method of any of the previous paragraphs, processing the indication from the vehicle motion sensor comprises determining whether the indication from the vehicle motion sensor is a result of movement of air near the vehicle.

An example embodiment having at least one of the features of the method of any of the previous paragraphs includes determining a direction of movement of the vehicle from rest based on the vehicle motion sensor indication; determining a direction of air movement based on the indications from the plurality of barometric pressure sensors; determining that the movement of the vehicle is a result of air movement when the direction of air movement corresponds to the direction of movement of the vehicle; and determining that the movement of the vehicle from rest is a result of a force different than movement of the air when the direction of air movement does not correspond to the direction of movement of the vehicle.

An example embodiment having at least one of the features of the method of any of the previous paragraphs includes interpreting the indication from the vehicle motion sensor as a wake up signal to activate a vehicle alarm device based on determining that the movement of the vehicle is the result of the force different than the movement of the air, or dismissing the indication from the vehicle motion sensor as a false alarm wake up signal based on determining that the movement of the vehicle is the result of the movement of the air.

An example embodiment having at least one of the features of the method of any of the previous paragraphs includes determining that the vehicle is in motion independent of movement of the air when the indications from the vehicle motion sensor and the plurality of barometric pressure sensors correspond to movement of the vehicle in a direction that is opposite to a direction of the movement of the air; and determining that movement of the vehicle is a result of movement of the air when the indications from the vehicle motion sensor and the plurality of barometric pressure sensors correspond to movement of the vehicle in a direction that is the same as the direction of movement of the air.

An example embodiment having at least one of the features of the method of any of the previous paragraphs includes calibrating the vehicle motion sensor based on the determination regarding vehicle movement corresponding to no movement of the vehicle.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention, such as that described below, include using information from barometric pressure sensors for making a determination regarding vehicle motion, such as whether air movement has caused vehicle motion. The barometric pressure sensor information is useful, for example, to determine whether conditions are appropriate for calibrating an inertial measurement unit or activating a vehicle alarm in response to an indication from an vehicle motion sensor.

Figure 1:
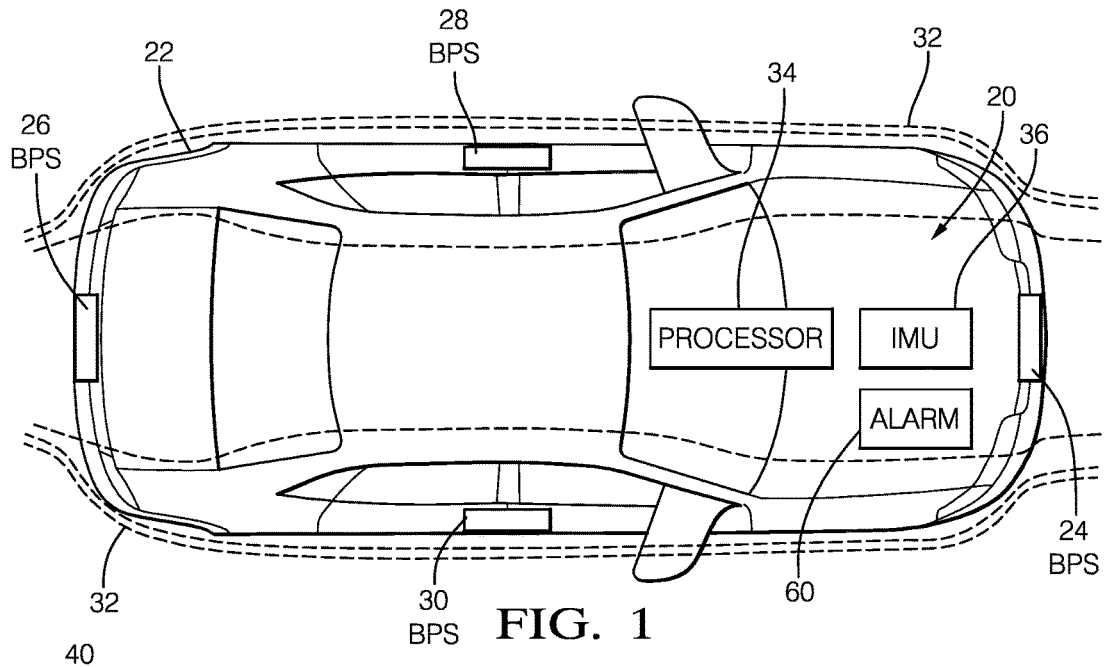
FIG. 1 schematically illustrates a vehicle with a sensor system including barometric pressure sensors.

FIG. 1 schematically illustrates a vehicle sensor system 20 that is supported on a vehicle 22. The vehicle sensor system 20 includes a plurality of barometric pressure sensors (BPSs) 24, 26, 28 and 30. The BPSs operate in a known manner to detect changes in atmospheric pressure and provide respective indications of the detected pressure. For example, the BPSs 24-30 provide an indication of relative movement between the vehicle 22 and air nearby the vehicle 22 as schematically represented by the lines 32. Relative movement between the vehicle 22 and air nearby the vehicle 22 may be the result of vehicle motion along a driving surface, wind, or a combination of them.

A first BPS 24 is supported on a portion of the vehicle 22 that faces at least partially in a first direction. In the illustrated example, the first BPS 24 is supported on a front of the vehicle 22. A second BPS 26 is supported on a second portion of the vehicle 22 that faces at least partially in a second direction that is different than the first direction. In the illustrated example, the second BPS 26 is supported on the rear or back of the vehicle 22. A third BPS 28 and a fourth BPS 30 are supported on oppositely facing sides of the vehicle 22.

A processor 34, which includes a computing device, receives indications or the output of each of the BPSs 24-30. The processor 34 uses the indications from the BPSs 24-30 to make a determination regarding vehicle movement, which may include a feature or characteristic of relative movement between the vehicle 22 and the air nearby the vehicle 22.

The vehicle sensor system 20 also includes at least one vehicle motion sensor 36. In the illustrated example embodiment, an inertial measurement unit (IMU) 36 provides an indication of vehicle motion. The IMU 36 includes an accelerometer and a gyroscope, both of which provide an indication of vehicle motion. The indication from the IMU 36 will be considered to be a result of the operation of either the gyroscope or accelerometer in this description except where noted below.

Figure 2:
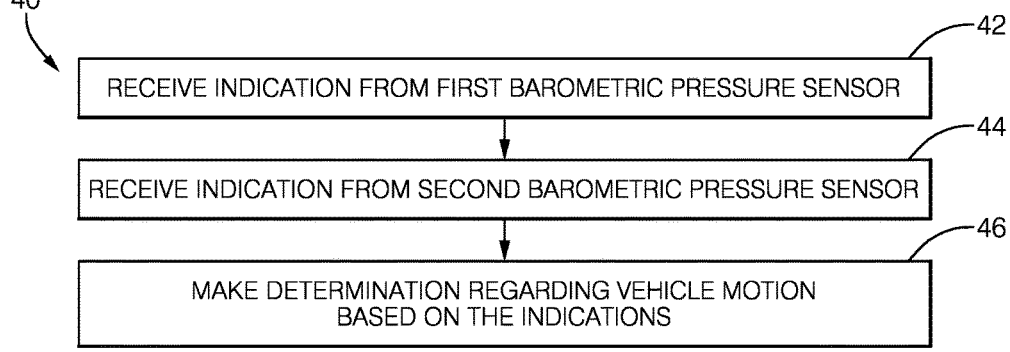
FIG. 2 is a flowchart diagram summarizing a technique of using indications from the barometric pressure sensors shown in FIG. 1.

FIG. 2 is a flowchart diagram 40 summarizing how the processor 34 uses indications from the BPSs 24-30. At 42, the processor 34 receives an indication from the first BPS 24 corresponding to air pressure detected by the first BPS 24 at the front of the vehicle 22. The detected air pressure may be the result of air movement or wind directed at the front of the vehicle 22 or movement of the vehicle 22 in a forward direction, for example. At 44, the processor 34 receives an indication from the second BPS 26 corresponding to air pressure detected by the second BPS 26. At 46, the processor 34 makes a determination regarding vehicle motion based on the received indications.

The processor 34 makes the determination regarding vehicle motion in some instances by determining whether the vehicle 22 is stationary or in motion. In other words, the determination may be regarding a state of vehicle motion, which can be a state of no motion when the vehicle 22 is stationary or a state of motion when the vehicle is moving.

Another example determination made by the processor 34 in at least some circumstances is a cause of vehicle motion when there is movement of the vehicle 22. For example, even though the vehicle 22 is not being driven, a wind gust may shake or push the vehicle 22 in a way that causes temporary movement of at least the vehicle body. The processor 34 is programmed or otherwise configured to determine when wind is a cause of such vehicle motion based on at least the indications from the BPSs.

One example way in which the processor 34 determines whether wind or air movement is a cause of vehicle motion is by determining a relationship between the indications from the BPSs 24-30. For example, when there is a difference in the pressure detected by BPSs on oppositely facing sides of the vehicle 22 that exceeds a predetermined threshold, the processor 34 interprets such a difference as an indicator that wind near the vehicle 22 is strong enough to at least potentially be the cause of vehicle motion. The processor 34 may use additional information, such as an indication from the IMU 36, to determine whether vehicle motion was the result of wind.

Another example determination made by the processor 34 in at least some circumstances is a direction of air movement relative to the vehicle 22. For example, when the vehicle 22 is traveling forward, there will be wind resistance in a front-to-rear direction. Similarly, when a wind gust blows toward the front of the vehicle, even if the vehicle is stationary, the direction of air movement relative to the vehicle 22 is in a front-to-rear direction.

The processor 34 determines the direction of air movement relative to the vehicle 22 based on a relationship between the indications from at least two of the BPSs 24-30. For example, when the indication from the first BPS 24 indicates a larger change in pressure than the indication from the second BPS 26, the processor 34 determines that air movement relative to the vehicle 22 is from the front of the vehicle 22 toward the rear.

With the BPSs 24-30 in the illustrated arrangement on the example vehicle 22, the processor 34 may determine a direction of air movement with more precision than simply front-to-rear or side-to-side. For example, when the pressure indication from the first BPS 24 is greater than the pressure indication from the second BPS 26 and the pressure indication from the third BPS 28 is greater than the pressure indication from the fourth BPS 30, the processor 34 determines that the wind is approaching the vehicle from the left-front of the vehicle 22, which corresponds to the top-right in the drawing.

In some embodiments, the processor 34 determines an angle at which the wind approaches the vehicle 22. The processor 34 in some example embodiments is programmed or otherwise configured to determine the angle of the wind from the following relationship: $\text{Tan}^{-1}((BPS28-BPS30)/BPS24-BPS26))$, where BPS represents the pressure indicated by the BPS having the reference number i in FIG. 1. This provides a clockwise positive angle (according to the illustration) of wind direction relative to the vehicle 22.

The determination regarding vehicle motion made by the processor 34 is useful for a variety of purposes. One example use is to interpret or enhance the processing of information provided by a vehicle motion sensor, such as the IMU 36. Another example use is to determine when conditions are appropriate to calibrate a vehicle motion sensor.

Figure 3:
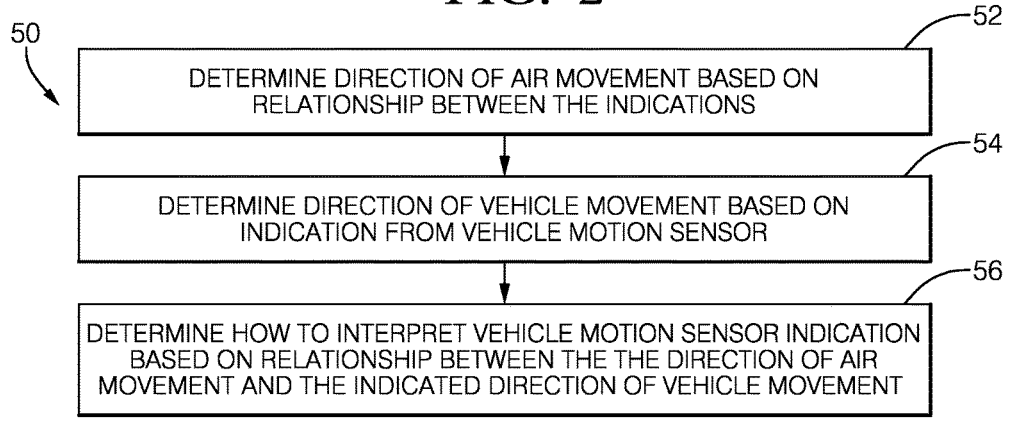
FIG. 3 is a flowchart diagram summarizing a technique of using a determination based on indications from the barometric pressure sensors to interpret an output from a vehicle motion sensor.

One example use of the determination regarding vehicle motion based on the BPS indications for interpreting the output from the IMU 36 is summarized in the flowchart 50 of FIG. 3. At 52, the processor 34 determines the direction of air movement relative to the vehicle 22 based on the indications from at least two of the BPSs. In this example, at least three BPS indications are used to determine the direction of air movement. The processor 34 uses a relationship between the respective BPS indications, such as one of the relationships mentioned above, to determine the direction of air movement.

At 54, the vehicle motion sensor 36 detects vehicle motion and provides an indication of the detected vehicle motion to the processor 34. In this example, the processor 34 determines a direction of vehicle movement based on the indication from the IMU 36. At 56, the processor 34 determines how to interpret the indication from the vehicle motion sensor based on a relationship between the direction of air movement and the determined direction of vehicle movement. Interpreting the output of the IMU 36 may include verifying or corroborating the determined direction of vehicle movement. Another interpretation includes determining whether the vehicle movement resulted from air movement relative to the vehicle 22 or another force, such as the engine of the vehicle being used to drive the vehicle.

For example, the relationship between the directions of air movement and vehicle movement may indicate that the vehicle is in motion and, in that case, relative movement between the vehicle 22 and the nearby air is at least partially due to the vehicle traveling along a driving surface. The BSPs will detect the pressure associated with natural wind resistance as the vehicle is in motion.

When the vehicle 22 begins to move from rest, the processor 34 determines that the difference in the BPS indications from the first BPS 24 and the second BPS 26 corresponds to air movement in a front-to-rear direction relative to the vehicle 22. At the same time, the output from the gyroscope of the IMU 36 will initially indicate a tilt backward. A short time after the initial acceleration from rest, the accelerometer of the IMU 36 will indicate forward movement of the vehicle 22. Under such conditions, the processor 34 determines that the direction of air movement and the direction of vehicle movement are consistent with each other and both correspond to forward movement of the vehicle 22. The processor 34 interprets the indication from the IMU 36 in this instance based on the indications from the BPSs to confirm that the IMU indication is a result of movement of the vehicle 22 in a forward direction.

Sometimes an indication from the IMU 36 may result from movement of the vehicle that was caused by wind. The processor 34 interprets the indication from the IMU 36 based on the relationship between the determined directions at 56 in FIG. 3 to recognize such a situation. For example, when the direction of air movement determined at 52 is in a front-to-rear direction and the direction of vehicle movement determined at 54 is rearward, the processor 34 determines that such vehicle movement is a result of wind against the vehicle 22.

When wind approaches the vehicle 22 from the front, the wind may push the vehicle body and rock it backward enough to cause the IMU 36 to indicate rearward movement of the vehicle 22. The gyroscope tilt at that time will be backward and the accelerometer will indicate a rearward acceleration. The processor 34 interprets such an output from the IMU 36 based on the indications of the BPSs and, in particular in this example, based on the determined direction of air movement. When the indication from the IMU 36 is consistent with vehicle movement that corresponds to or is consistent with the direction of air movement, the processor 34 interprets the indication from the IMU and determines that the indication was the result of wind moving the vehicle 22.

Windy conditions may cause some vehicle movement while the vehicle 22 is otherwise stationary or in motion. Wind against the side of the vehicle 22, if strong enough, could cause a lateral acceleration. The processor 34 is able to interpret the indication of such a a lateral acceleration as a result of the wind based on corresponding wind direction information from the BPSs 28 and 30, for example.

One way in which the output or indication of the IMU 36 is used in the illustrated example embodiment of FIG. 1 is to control activation of a vehicle alarm 60. The processor 34 uses an indication of vehicle movement from rest from the IMU 36 as a wake up signal to trigger the alarm 60. If a potential vehicle thief or intruder causes movement of the vehicle 22, the alarm 60 will be triggered based on the corresponding indication of the IMU 36.

There are situations in which the IMU 36 indicates vehicle movement resulting from wind and, in those situations, it would be beneficial to not activate the alarm 60. The processor 34 uses the determinations in FIG. 3 to interpret an indication from the IMU 36 to determine if it should be treated as a wake-up, alarm-triggering signal or if it can be dismissed as the result of wind. When the direction of detected wind and the direction of detected vehicle movement correspond sufficiently, the processor interprets the IMU indication as a result of wind. When the directions of the detected wind and the detected vehicle movement do not correspond, the processor 34 interprets the IMU indication as an alarm triggering signal and activates the alarm 60. Similarly, if the BPSs do not indicate any wind at a time corresponding to an IMU indication of vehicle movement from rest, the processor 34 interprets the IMU indication as wake up signal to activate the alarm.

Another example use of the information regarding vehicle movement determined by the processor 34 based on indications from the BPSs is calibrating or confirming operation of a vehicle motion sensor such as the IMU 36. For example, commercially available IMUs are prone to gyroscopic and accelerometer drift that renders the devices unreliable for untethered dead reckoning. Using the indications from the BPSs allows for confirming that the vehicle 22 is stationary, which is useful when performing a zero velocity update of the IMU gyroscope to strip off static errors.

In an example embodiment, the processor 34 determines that the vehicle is stationary as a prerequisite to performing a gyroscope update. The indications from the BPSs have to correspond to the vehicle being at rest before the processor 34 will perform the update and remove accumulated drift error from the gyroscope output. The determination that the vehicle 22 is stationary is based on the processor 34 determining that any difference between the pressures indicated by the BPSs on opposite sides of the vehicle is within a predetermined range or zero. When such conditions exist, the vehicle 22 is not moving because movement of the vehicle results in pressure differentials as the vehicle pushes through the air.

In some embodiments, the processor 34 can accept some limited movement of the vehicle during a sensor calibration or update when such movement is consistent with wind moving the vehicle. For example, when the wind direction and the limited vehicle movement are in the same direction, it may be possible to properly perform a calibration or sensor update.

In some embodiments, the processor 34 will only perform a process, such as a zero velocity update of an IMU or activate a vehicle alarm, when the processor 34 determines that there is no wind. If the processor 34 determines that it is windy based on the indications from the BPSs, the processor in some embodiments will not perform a vehicle motion sensor calibration or update and will not activate the alarm 60.

Wheel tick sensors are another type of vehicle motion sensor that can be calibrated or verified using indications from the BPSs. Some wheel tick sensors may have a dead zone in which the sensor indicates no movement at a low speed. By determining that the vehicle is stationary based on the indications from the BPSs, the processor 34 can determine whether a wheel tick sensor is providing an accurate output. If necessary, the sensor can be updated or calibrated.

Since the BPSs in some embodiments are sensitive to changes in atmospheric pressure associated with weather conditions, the processor 34 in at least some embodiments monitors pressure changes indicated by the BPSs over time. When a change occurs at a rate that corresponds more closely to a local change in atmospheric pressure than vehicle movement or wind, the change in pressure is ignored or filtered out by the processor 34. A range for the rate of change that is suitable to discern between atmospheric pressure indications and relative movement between the vehicle 22 and the air can be determined to meet the needs of a particular implementation.

Another way that the processor 34 in this example embodiment determines whether a change in pressure indicated by the BPSs is based on the local atmospheric pressure conditions is by comparing the differences between the indications from the BPSs. When oppositely facing BPSs indicate the same change in pressure, that corresponds to an atmospheric pressure change. On the other hand, a significant enough difference between oppositely facing BPSs corresponds to wind or vehicle movement.

Using BPS indications in a manner like those described above facilitates making determinations regarding vehicle motion and is useful for more accurately interpreting vehicle motion sensor information. Additionally, the BPS indications allow for improved vehicle motion sensor calibration.

While a variety of features are described separately from each other, those features are not necessarily separate in embodiments consistent with this disclosure. Various combinations of such features are possible to realize other embodiments or additional functions of the vehicle sensor system 20 or processor 34.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A vehicle sensor system, comprising:
a plurality of barometric pressure sensors including a first barometric pressure sensor situated on a first portion of the vehicle that faces at least partially in a first direction and a second barometric pressure sensor situated on a second portion of the vehicle that faces at least partially in a second direction that is different than the first direction;
a vehicle motion sensor supported on the vehicle, the vehicle motion sensor being configured to provide an indication of vehicle motion; and
a processor configured to
make a determination regarding vehicle motion based on respective indications from the plurality of barometric pressure sensors and use the determination based on the indications from the barometric pressure sensors to determine whether the indication from the vehicle motion sensor is a result of movement of air near the vehicle including
determining that the vehicle is in motion independent of movement of the air when the indications from the vehicle motion sensor and the plurality of barometric pressure sensors correspond to movement of the vehicle in a direction that is opposite to a direction of the movement of the air, and
determining that movement of the vehicle is a result of movement of the air when the indications from the vehicle motion sensor and the plurality of barometric pressure sensors correspond to movement of the vehicle in a direction that is the same as the direction of movement of the air.

2. The vehicle sensor system of claim 1, wherein the processor is configured to determine the direction of movement of air near the vehicle based on a relationship between the indication from the first barometric pressure sensor and the indication from the second barometric pressure sensor.

3. The vehicle sensor system of claim 2, wherein
the plurality of barometric pressure sensors includes a third barometric pressure sensor and a fourth barometric pressure sensor,
the third barometric pressure sensor is situated on a third portion of the vehicle that faces at least partially in a third direction,
the fourth barometric pressure sensor is situated on a fourth portion of the vehicle that faces at least partially in a fourth direction,
the first direction is generally opposite the second direction,
the third direction is generally perpendicular to the first and second directions,
the fourth direction is generally opposite the third direction, and
the processor is configured to determine the direction of movement of air near the vehicle based on a difference between the indication from the third barometric pressure sensor and the indication from the fourth barometric pressure sensor and a difference between the indication from the first barometric pressure sensor and the indication from the second barometric pressure sensor.

4. The vehicle sensor system of claim 1, wherein the processor is configured to perform a calibration of the vehicle motion sensor when the vehicle is stationary.

5. The vehicle sensor system of claim 4, wherein the calibration includes removing static errors from the indication from the vehicle motion sensor while there is no movement of the vehicle.

6. The vehicle sensor system of claim 5, wherein the vehicle motion sensor comprises an inertial measurement unit including at least an accelerometer and a gyroscope.

7. A vehicle sensor system, comprising:
a plurality of barometric pressure sensors including a first barometric pressure sensor situated on a first portion of the vehicle that faces at least partially in a first direction and a second barometric pressure sensor situated on a second portion of the vehicle that faces at least partially in a second direction that is different than the first direction;
a vehicle motion sensor supported on the vehicle, the vehicle motion sensor being configured to provide an indication of vehicle motion; and
a processor that is configured to make a determination regarding vehicle motion based on respective indications from the plurality of barometric pressure sensors, wherein
the processor is configured to determine a direction of movement of the vehicle from rest based on the vehicle motion sensor indication;
the determination based on the indications from the barometric pressure sensors includes a direction of air movement;
the processor is configured to determine that the movement of the vehicle is a result of air movement when the direction of air movement corresponds to the direction of movement of the vehicle; and
the processor is configured to determine that the movement of the vehicle from rest is a result of a force different than movement of the air when the direction of air movement does not correspond to the direction of movement of the vehicle.

8. The vehicle sensor system of claim 7, wherein
the processor interprets the indication from the vehicle motion sensor as a wake up signal to activate a vehicle alarm device based on determining that the movement of the vehicle is the result of the force different than the movement of the air; or
the processor dismisses the indication from the vehicle motion sensor as a false alarm wake up signal based on determining that the movement of the vehicle is the result of the movement of the air.

9. A method of monitoring vehicle motion using a plurality of barometric pressure sensors including a first barometric pressure sensor situated on a first portion of the vehicle that faces at least partially in a first direction and a second barometric pressure sensor situated on a second portion of the vehicle that faces at least partially in a second direction that is different than the first direction, wherein a vehicle motion sensor is supported on the vehicle and provides an indication of vehicle motion the method comprising:
making a determination regarding vehicle motion based on respective indications from the plurality of barometric pressure sensors; and
using the determination based on the indications from the barometric pressure sensors to determine whether the indication from the vehicle motion sensor is a result of movement of air near the vehicle including
determining that the vehicle is in motion independent of movement of the air when the indications from the vehicle motion sensor and the plurality of barometric pressure sensors correspond to movement of the vehicle in a direction that is opposite to a direction of the movement of the air, and determining that movement of the vehicle is a result of movement of the air when the indications from the vehicle motion sensor and the plurality of barometric pressure sensors correspond to movement of the vehicle in a direction that is the same as the direction of movement of the air.

10. The method of claim 9, comprising determining a direction of movement of the vehicle from rest based on the vehicle motion sensor indication;

determining a direction of air movement based on the indications from the plurality of barometric pressure sensors;

determining that the movement of the vehicle from rest is a result of air movement when the direction of air movement corresponds to the direction of movement of the vehicle; and determining that the movement of the vehicle from rest is a result of a force different than movement of the air when the direction of air movement does not correspond to the direction of movement of the vehicle.

11. The method of claim 10, comprising interpreting the indication from the vehicle motion sensor as a wake up signal to activate a vehicle alarm device based on determining that the movement of the vehicle from rest is the result of the force different than the movement of the air; or dismissing the indication from the vehicle motion sensor as a false alarm wake up signal based on determining that the movement of the vehicle from rest is the result of the movement of the air.

12. The method of claim 9, comprising calibrating the vehicle motion sensor at a time when there is no movement of the vehicle.

* * * * *